(12) United States Patent
Greene et al.

(10) Patent No.: US 6,501,021 B1
(45) Date of Patent: Dec. 31, 2002

(54) SHIMMING DEVICE FOR ELECTRICAL BOX

(76) Inventors: Randy Joseph Greene, P.O. Box 117, Milesburg, PA (US) 16853; Russell Lee Myers, 112 Darla Dr., Bellefonte, PA (US) 16823

( * ) Notice: Subject to any disclaimer, the term of this patent is extended or adjusted under 35 U.S.C. 154(b) by 0 days.

(21) Appl. No.: 09/634,538

(22) Filed: Aug. 8, 2000

(51) Int. Cl.[7] .................................................. H01H 9/02
(52) U.S. Cl. .............................. 174/58; 174/53; 174/66; 220/241
(58) Field of Search ............................ 174/58, 53, 112; 220/241, 3.8; 248/906, 63, 66; 411/546, 547, 575, 526

(56) References Cited

U.S. PATENT DOCUMENTS

| | | | | |
|---|---|---|---|---|
| 1,744,706 A | * | 1/1930 | Hanny | |
| 2,492,115 A | * | 12/1949 | Crowther | 35/5 |
| 3,362,737 A | * | 1/1968 | Cobb | 411/165 X |
| 4,158,746 A | * | 6/1979 | Taylor et al. | 174/112 |
| 4,226,393 A | * | 10/1980 | Rardin et al. | 174/58 X |
| 4,292,007 A | * | 9/1981 | Wagner | 411/156 |
| 4,486,134 A | * | 12/1984 | White | 411/107 |
| 4,528,420 A | * | 7/1985 | Kish et al. | 174/112 |
| 4,629,285 A | * | 12/1986 | Carter et al. | 350/96.23 |
| 4,948,317 A | * | 8/1990 | Marinaro | 411/547 X |
| 4,988,832 A | * | 1/1991 | Shotey | 174/67 |
| 5,524,330 A | * | 6/1996 | Alberini | 29/437 |
| 5,594,208 A | * | 1/1997 | Cancellieri et al. | 174/58 |
| 5,862,774 A | * | 1/1999 | Moss | 116/200 |

* cited by examiner

Primary Examiner—Anthony Dinkins
Assistant Examiner—Dhiru R Patel
(74) Attorney, Agent, or Firm—Rodney A. Corl

(57) ABSTRACT

A shim for rigidly attaching an electrical device, such as a receptacle or switch, to an electrical box is described. The shim has means for frictionally engaging the attachment screw preventing it from falling off before the screw is attached to the box. The shim is made in varying thickness with each thickness of shim made from a different color for ease of identification.

5 Claims, 1 Drawing Sheet

SHIMMING DEVICE FOR ELECTRICAL BOX

BACKGROUND OF THE INVENTION

The present invention relates to electrical boxes used in residential, commercial and industrial wiring. More particularly, the invention provides a shim or spacer between the electrical box and devices mounted within the box.

When an electrical device, such as a switch or receptacle, is mounted in an electrical box, the box is not always mounted flush with the wall surface. This leaves a gap between the device and the box, preventing a rigid attachment to the box. While most electrical devices today have ears or tabs to engage the wall surface providing a rigid attachment to the wall, the wall surface can erode over time resulting in a loose fit of the electrical device to the wall and box. One previous attempt at bridging the gap between the device and box has included the use of metal washers. However, these metal washers are awkward to keep on the screw while attaching the device and are usually not the correct thickness to bridge the gap. Other devices have been tried such as cardboard shims, but these also tend to wear and loosen with time.

One object of the present invention is to provide a shim for electrical devices within an electrical box that is easy to install. Another object of the present invention is to provide a shim for electrical devices with varying thickness allowing for shimming different size gaps.

BRIEF SUMMARY OF THE INVENTION

The shim of the present invention is a plastic, cylindrical shaped device of varied thickness. A hole extends through the shim to allow the passing of the screw which holds the electrical device to the electrical box. This hole is sized to allow screws of common sizes, such as a number 6 or number 8, to pass. Means are provided within the hole to frictionally engage the screw thus preventing the shim from falling off once it has been placed onto the screw. The shims can be made with different thickness to bridge different size gaps, and each different thickness can be color coded to allow easy identification of the various thickness. If the correct thickness of shim is not available, multiple shims can be used in combination to provide the proper thickness needed.

BRIEF DESCRIPTION OF THE DRAWINGS

The invention will be further described in connection with the accompanying drawings, in which.

DETAILED DESCRIPTION

The present invention attempts to solve a problem found in the electrical wiring field and more particularly in electrical devices used in residential, commercial and industrial wiring applications. When an electrical device, such as a switch or receptacle, is mounted in a box in a wall, the box is not usually mounted perfectly flush with the wall. When this happens, the electrical device is not affixed rigidly to the box by the mounting screws, but is instead held against the wall but not against the box. As the wall surface erodes over time, the electrical device becomes loose, further erodes the wall and even presents a hazardous situation. The shim of the present invention allows the electrical device to be affixed firmly to the box no matter how well the box is mounted in the wall surface.

Figure 1:
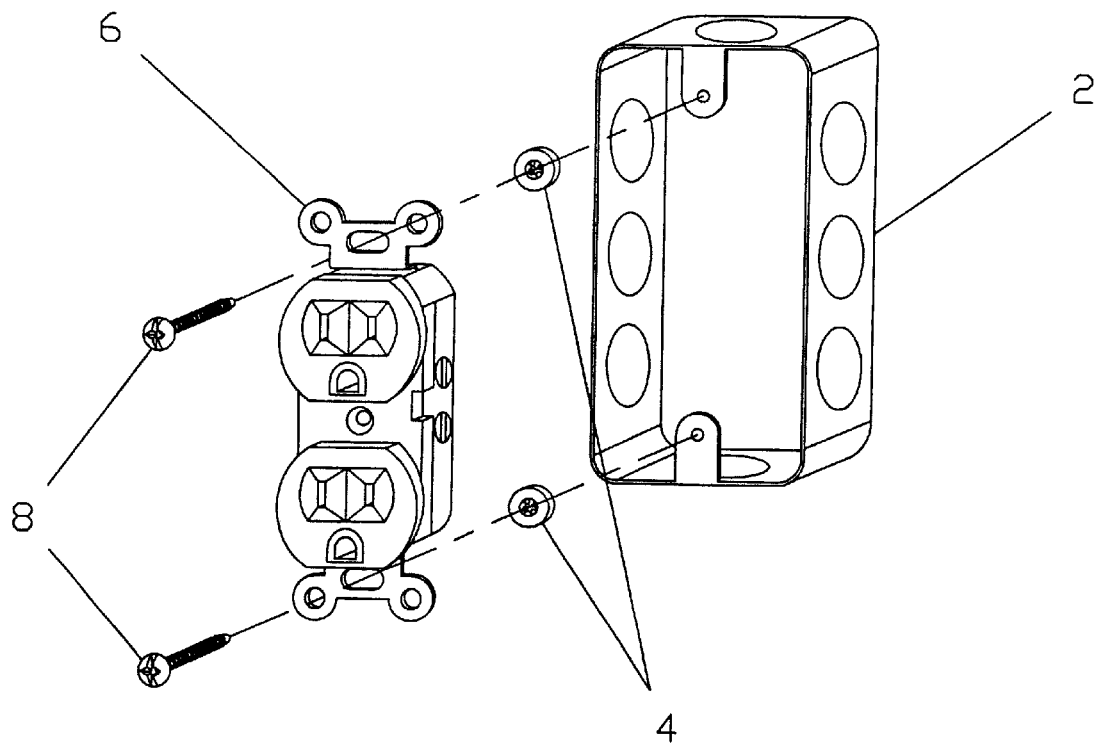
FIG. 1 is an exploded view showing the shim in its use in an electrical box.

The shim of the present invention is shown in its intended use in FIG. 1. An electrical box 2 is mounted in a wall or ceiling surface (not shown) by any conventional means as is known in the art. As these boxes are rarely mounted flush with the wall surface, the shim 4 of the present invention is placed between an electrical device 6 and the box 2 so as to rigidly affix the electrical device 6 to the box 2. The electrical device 6 may be a receptacle, switch, ceiling fixture bar or any other device as is commonly mounted within the box 2. The shim 4 is placed over the screws 8 after the screws have passed through the electrical device 6 and before attaching the screws to the box 2.

Figure 2:
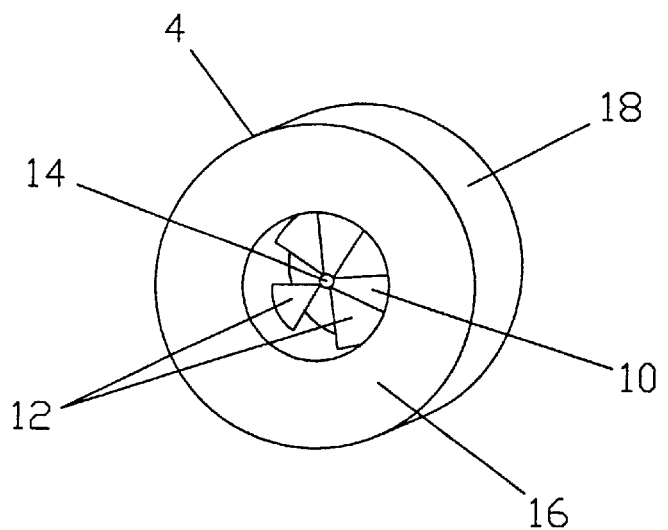
FIG. 2 is a perspective view of the shim constructed in accordance with the invention.

An important aspect of the invention is shown in FIG. 2. In current practice, it is common to slide metal washers over the screws 8 shown in FIG. 1, using enough washers to bridge the gap between the box 2 and the electrical device 6. A problem with this method is the washers tend to slide off before the screws can be attached to the box. In the present invention, shim 4 has opening 10 sized to accommodate the screws 8. To prevent the shim 4 from sliding off the screws, thin projections 12 extend from the inside side walls of opening 10 toward the center 14 of the opening. These thin projections 12 frictionally engage screws 8 preventing shim 4 from sliding off prior to the screws being attached to the box. Projections 12 can be made by boring opening 10 partially through the body 16 of a solid disc of nylon or other plastic material, leaving only a thin film of material in opening 10. Projections 12 can then be cut from this film of material with a razor knife or other sharp tool. Alternatively, shim 4 can be molded with projections 12 already in place.

Another important aspect of the invention relates to the thickness of the shim. Shim 4 can formed with thickness 18 varying from 1/16 inch to 1/4 inch in 1/16 inch increments. Each different thickness shim is made from a different color material so as to allow easy identification of the thickness of the shim 4. Multiple shims can be placed on the screw 8 as needed to bridge the gap between electrical device 6 and box 2.

While a preferred form of the invention has been shown in the drawings and described in the preceding paragraphs, variations of the preferred form will be apparent to those skilled in the art, and the invention should not be construed as limited to the specific form shown and described, but instead is as set forth in the following claims.

We claim:

1. A method for rigidly affixing an electrical device to an electrical box wherein said electrical device is spaced from said electrical box by a gap therebetween, said method comprising determining the width of said gap, choosing a shim from a plurality of shims of different thickness, said chosen shim having a thickness greater than the width of said gap, placing said chosen shim over an attachment device after said attachment device is placed through said electrical device but before said attachment device is attached to said electrical box, and attaching said attachment device to said electrical box wherein the step of placing said chosen shim over an attachment device prevents said shim from sliding off said attachment device by means for fractionally engaging said attachment device extending inwardly from sidewalls of an opening through said shim, said means for frictionally engaging said attachment device being a thin film of material within said opening.

2. The method of claim 1, wherein the step of choosing said shim from said plurality of shims is made easier by having each different thickness of shim being a different color.

3. In an attachment of an electrical device to an electrical box by means of a screw, said electrical device being spaced from said electrical box by a gap, a shim for bridging said gap completely, said shim having a body with a thickness equal to or greater than said gap, said body having an opening therethrough, means within said opening for frictionally engaging said screw, said means for frictionally engaging said screw being a thin film of material within said opening, said shim engaging said screw between said electrical device and said box.

4. In an attachment of an electrical device to an electrical box, means for bridging a gap between said electrical device and said electrical box, said gap caused by a non-flush mounting of said electrical box within a mounting surface, said means for bridging a gap comprising a disc of plastic material having a body with a thickness greater than said gap, said body having an opening therethrough, said opening having means therein for frictionally engaging an attachment member, said means for frictionally engaging an attachment member comprises a thin film of material within said opening, said attachment member passing through said electrical device, through said opening, then attaching to said electrical box.

5. The means for bridging a gap of claim 4, wherein said opening has sidewalls and said thin film of material projects inwardly from said sidewalls.

\* \* \* \* \*